United States Patent
Li et al.

(10) Patent No.: US 11,262,496 B2
(45) Date of Patent: Mar. 1, 2022

(54) BACKLIGHT MODULE AND DISPLAY PANEL

(71) Applicants: Beijing BOE Optoelectronics Technology Co., Ltd., Beijing (CN); BOE TECHNOLOGY GROUP CO., LTD., Beijing (CN)

(72) Inventors: Wenyang Li, Beijing (CN); Rui Han, Beijing (CN); Dong Cui, Beijing (CN); Zeyuan Tong, Beijing (CN); Qing Ma, Beijing (CN); Shouyang Leng, Beijing (CN); Dong Guan, Beijing (CN); Fengping Wang, Beijing (CN); Weining Chi, Beijing (CN); Zhipeng Zhang, Beijing (CN); Yue Zhai, Beijing (CN); Zan Zhang, Beijing (CN); Yaoyao Wang, Beijing (CN); Xiaoxia Wang, Beijing (CN)

(73) Assignees: BOE TECHNOLOGY GROUP CO., LTD., Beijing (CN); Beijing BOE Optoelectronics Technology Co., Ltd., Beijing (CN)

(*) Notice: Subject to any disclaimer, the term of this patent is extended or adjusted under 35 U.S.C. 154(b) by 0 days.

(21) Appl. No.: 17/254,570

(22) PCT Filed: Jun. 30, 2020

(86) PCT No.: PCT/CN2020/099470
§ 371 (c)(1),
(2) Date: Dec. 21, 2020

(87) PCT Pub. No.: WO2021/000869
PCT Pub. Date: Jan. 7, 2021

(65) Prior Publication Data
US 2021/0199882 A1 Jul. 1, 2021

(30) Foreign Application Priority Data
Jul. 4, 2019 (CN) .......................... 201921033149.4

(51) Int. Cl.
*F21V 8/00* (2006.01)

(52) U.S. Cl.
CPC ........... *G02B 6/0088* (2013.01); *G02B 6/009* (2013.01); *G02B 6/0068* (2013.01)

(58) Field of Classification Search
None
See application file for complete search history.

(56) References Cited

U.S. PATENT DOCUMENTS 7,106,393 B2 * 9/2006 Lee .................. G02F 1/133308
349/58
7,764,331 B2 * 7/2010 Choi ..................... G06F 1/1601
349/58

(Continued)

FOREIGN PATENT DOCUMENTS

| CN | 101354496 A | 1/2009 |
| CN | 101770113 A | 7/2010 |

(Continued)

OTHER PUBLICATIONS

International Search Report for PCT/CN2020/099470 dated Sep. 16, 2020.

(Continued)

*Primary Examiner* — Britt D Hanley
(74) *Attorney, Agent, or Firm* — Thomas | Horstemeyer LLP

(57) ABSTRACT

The present disclosure relates to the field of display technology and, in particular, to a backlight module and a display panel. The backlight module may include a backplane, an optical film, and a light emitting plate. The backplane includes a bottom plate, a first side plate, and a second side plate, where the first side plate and the second side plate are arranged at two opposite sides of the bottom plate in a first direction, and both have support parts protruding toward an inner side of the back board. The optical (Continued)

film is arranged on a side of the support part away from the bottom plate, and has two opposite ends supported on the support parts. The light emitting part is arranged on the bottom plate and positioned at a side of the support part facing the bottom plate, and a light emitting direction of the light emitting part is toward the optical film.

20 Claims, 2 Drawing Sheets

(56) References Cited

U.S. PATENT DOCUMENTS

| | | | |
|---|---|---|---|
| 8,049,833 | B2 | 11/2011 | Park |
| 2009/0027584 | A1 | 1/2009 | Han et al. |
| 2010/0165234 | A1 | 7/2010 | Park |
| 2013/0286322 | A1 | 10/2013 | Kuo et al. |

FOREIGN PATENT DOCUMENTS

| | | |
|---|---|---|
| CN | 102629006 A | 8/2012 |
| CN | 209928187 U | 1/2020 |
| JP | 2016062022 A | 4/2016 |

OTHER PUBLICATIONS

Written Opinion of the International Searching Authority for PCT/CN2020/099470 dated Sep. 16, 2020.

\* cited by examiner

BACKLIGHT MODULE AND DISPLAY PANEL

CROSS-REFERENCE TO RELATED APPLICATIONS

The present application is a national phase application under 35 U.S.C. § 371 of International Patent Application No. PCT/CN2020/099470 filed on Jun. 30, 2020, which claims the benefit of and priority to Chinese Utility Model Application No. 201921033149.4, titled "Backlight Module and Display Panel" filed on Jul. 4, 2019, the entire contents of which are incorporated herein by reference.

TECHNICAL FIELD

The present disclosure relates to the technical field of display technology and, in particular, to a backlight module and a display panel.

BACKGROUND

With the rapid development of liquid crystal display technology, a liquid crystal display panel is increasingly used in various technical fields. For example, the liquid crystal display panel may be used in a vehicle-mounted instrument and central control display device. In order to save an occupied space of the vehicle instrument and the central control display device in a vehicle, the liquid crystal display panel is desired to be flexible. However, a backlight module of the liquid crystal display panel has a complicated structure, which results in a thicker backlight module and a higher cost, and is not conducive to bending. In addition, the liquid crystal display panel when being bent tends to press a light emitting part, which causes the light emitting part to be easily damaged and reduces a product yield.

It should be noted that the information disclosed in the background section above is only for enhancing the understanding of the background of the present disclosure, and therefore may include information that does not constitute the prior art known to those with ordinary skill in the art.

SUMMARY

The present disclosure provides a backlight module and a display panel.

An aspect of the present disclosure provides a backlight module, including:

a backplane, including a bottom plate, a first side plate and a second side plate, wherein the first side plate and the second side plate extend from a surface of the bottom plate in a direction away from the bottom plate, are arranged at two opposite sides of the bottom plate in a first direction, and both have support parts protruding toward an inner side of the backplane;

an optical film, arranged on a side of the support part away from the bottom plate, and having two opposite ends supported on the support parts; and a light emitting part, arranged on the bottom plate and positioned at a side of the support part facing the bottom plate, wherein a light emitting direction of the light emitting part is toward the optical film.

In some embodiments of the present disclosure, each of the first side plate and the second side plate includes a vertical plate and a bent plate which are integrally formed, wherein the vertical plate has one end coupled to the bottom plate and extends in the direction away from the bottom plate; and the bent plate has one end coupled to the bottom plate, and is bent toward the inner side of the backplane to form the support part.

In some embodiments of the present disclosure, the bent plate includes a first part and a second part, the first part has one end coupled to the bottom plate and extends in the direction away from the bottom plate, and the second part has one end coupled to the other end of the first part in an extending direction of the first part and extends toward the inner side of the backplane to form the support part.

In some embodiments of the present disclosure, a distance between the other end of the vertical plate in the extending direction of the vertical plate and the bottom plate is greater than a distance between the surface of the support part away from the bottom plate and the bottom plate.

In some embodiments of the present disclosure, each of the first side plate and the second side plate includes a plurality of vertical plates and a plurality of bent plates arranged alternately.

In some embodiments of the present disclosure, the backplane further includes a first auxiliary support plate and a second auxiliary support plate, and the first auxiliary support plate and the second auxiliary support plate are arranged at two opposite sides of the bottom plate in a second direction which is perpendicular to the first direction; and each of the first auxiliary support plate and the second auxiliary support plate includes a connection part and an auxiliary support part, the connection part has one end coupled to the bottom plate and extends in the direction away from the bottom plate, and auxiliary support part has one end coupled to the other end of the connection part in an extending direction of the connection part and extends toward the inner side of the backplane, wherein a surface of the auxiliary support part away from the bottom plate and the surface of the support part away from the bottom plate are located on a same plane.

In some embodiments of the present disclosure, the auxiliary support part and the support part have a same thickness in a direction perpendicular to the surface of the bottom plate.

In some embodiments of the present disclosure, there is a gap between the support part and the light emitting part in a direction perpendicular to the surface of the bottom plate.

In some embodiments of the present disclosure, a distance between the optical film and the light emitting part is 2.5 mm.

In some embodiments of the present disclosure, the backlight module further includes:

a transparent support plate, arranged on the support part and positioned at a side of the optical film facing the support part.

In some embodiments of the present disclosure, the optical film includes a quantum dot sheet, a diffusion sheet, a prism sheet, and a reflective polarizing sheet that are sequentially stacked on the support part.

In some embodiments of the present disclosure, the light emitting part includes a circuit board and a plurality of light emitting diodes, the circuit board is arranged on the bottom plate, and each of the light emitting diodes is arranged at a side of the circuit board away from the bottom plate.

In some embodiments of the present disclosure, the optical film is arranged between the vertical plate of the first side plate and the vertical plate of the second side plate in the first direction.

Another aspect of the present disclosure provides a display panel including a display module, wherein the display module includes:

the backlight module according to any one of the above embodiments; and a display screen, arranged at a side of the optical film away from the support part.

In some embodiments of the present disclosure, the display module further includes an edging adhesive tape, the edging adhesive tape includes a top edging adhesive tape and a bottom edging adhesive tape that are arranged oppositely, and a side edging adhesive tape connecting the top edging adhesive tape and the bottom edging adhesive tape, and the top edging adhesive tape is adhered to a top edge of the display screen, the bottom edging adhesive tape is adhered to a bottom edge of the bottom plate, and the side edging adhesive tape is adhered to side surfaces of the display screen and the backlight module.

In some embodiments of the present disclosure, the display panel further includes a curved module housing, the display module is installed in the module housing, and a shape of the display module is matched with a shape of the module housing.

In some embodiments of the present disclosure, a surface of the display screen away from the bottom plate and end surfaces of the first side plate and the second side plate away from the surface of the bottom plate are located on a same plane.

It should be understood that the above general description and the following detailed description are only exemplary and explanatory, and cannot limit the present disclosure.

BRIEF DESCRIPTION OF THE DRAWINGS

The drawings herein are incorporated into the specification and constitute a part of the specification, show embodiments that conform to the present disclosure, and together with the specification, serve to explain the principle of the present disclosure. Understandably, the drawings in the following description are only some embodiments of the present disclosure, and other drawings can be obtained by those with ordinary skill in the art from these drawings without creative work.

DETAILED DESCRIPTION

Figure 1:
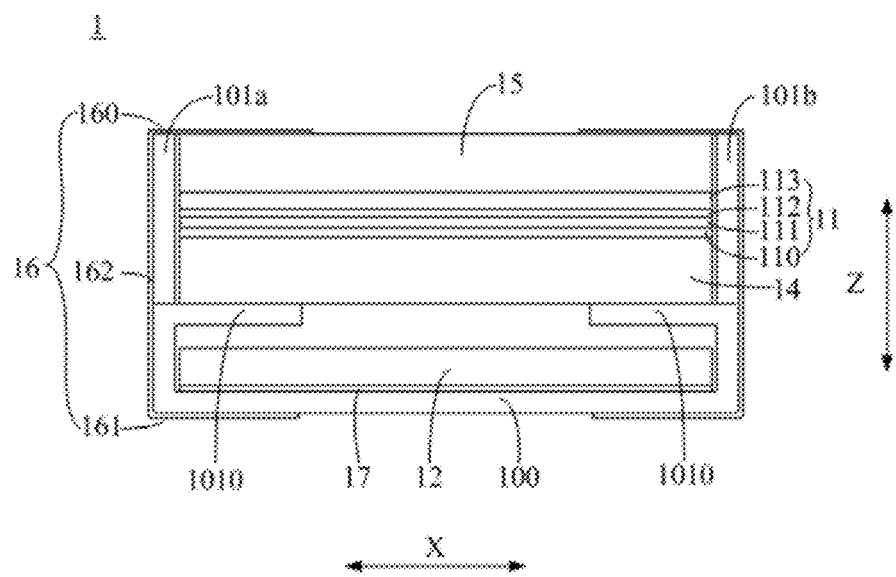
FIG. 1 shows a schematic structural diagram of a display module according to an embodiment of the present disclosure.

Example embodiments will now be described more fully with reference to the accompanying drawings. However, the example embodiments may be implemented in various forms, and should not be construed as being limited to the embodiments set forth herein; on the contrary, these embodiments are provided so that the present disclosure will be comprehensive and complete, and the concept of the example embodiments will be fully conveyed to those skilled in the art. The same reference numerals in the figures represent the same or similar structures, and thus their detailed descriptions will be omitted.

Although relative terms such as "upper" and "lower" are used in the specification to describe a relative relationship between one component and another component shown, these terms are used in the specification only for the convenience of description, for example, according to the example direction described in the accompanying drawings. It can be understood that if a device shown is turned over, the component described as "upper" will become a "lower" component. When a structure is "on" another structure, it may mean that a certain structure is integrally formed on another structure, or that a certain structure is "directly" arranged on another structure, or that a certain structure is "indirectly" arranged on another structure through a structure.

The terms "a/an", "the" and "said" are used to indicate the presence of one or more elements/part/etc.; the terms "including" and "having" are used to indicate an open-ended meaning of inclusion and refer to that there may be other elements/part/etc. in addition to the listed elements/part/etc.; and the terms "first", "second", etc. are only used as tokens, and are not to limit the number of objects.

At present, a liquid crystal display panel usually includes a liquid crystal display screen and a backlight module arranged at the back of the liquid crystal display screen. The backlight module is used to provide a light source for the liquid crystal display screen. A traditional backlight module usually includes a backplane, a light emitting part, a light guide plate, an optical film, a middle frame, a top cover, and the like. The backplane, middle frame and top cover are used to fix the light emitting part, light guide plate and optical film. Since the traditional module includes a plurality of part and has a complicated structure, the backlight module is thicker, more expensive, and not conducive to bending. In addition, the liquid crystal display panel when being bent tends to press the light emitting part, which causes the light emitting part to be easily damaged and reduces a product yield.

Figure 2:
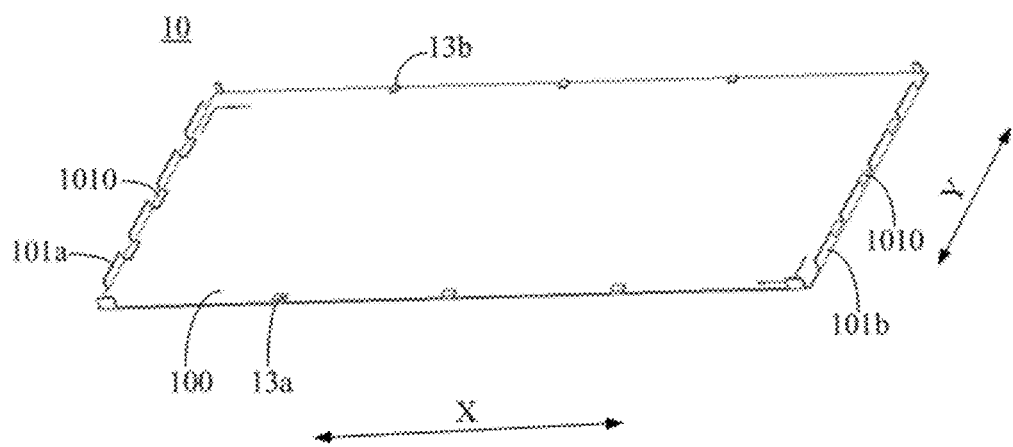
FIG. 2 shows a schematic structural diagram of a backplane in a backlight module according to an embodiment of the present disclosure.
Figure 3:
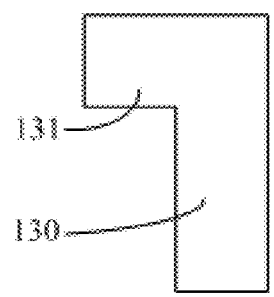
FIG. 3 shows a schematic structural diagram of a first auxiliary support plate (or a second auxiliary support plate) in a backlight module according to an embodiment of the present disclosure.
Figure 4:
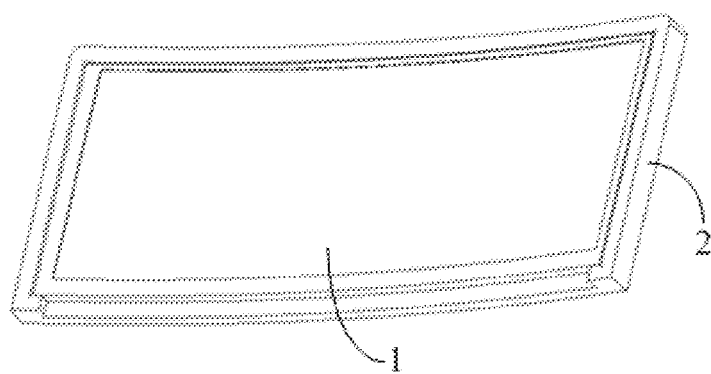
FIG. 4 shows a schematic structural diagram of a display panel according to an embodiment of the present disclosure.
Figure 5:
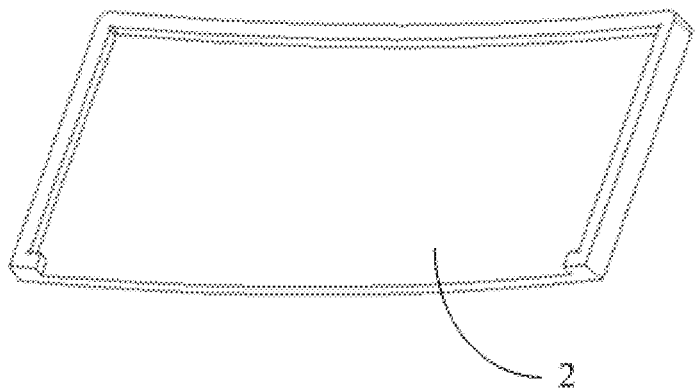
FIG. 5 shows a schematic structural diagram of a module housing in a display panel according to an embodiment of the present disclosure.

In order to solve the above technical problem, an embodiment of the present disclosure provides a backlight module, which can be applied to a display panel. As shown in FIGS. 1 and 2, the backlight module may include a backplane 10, an optical film 11, and a light emitting part 12. The backplane 10 may include a bottom plate 100, a first side plate 101a and a second side plate 101b. The first side plate 101a and the second side plate 101b are arranged at two opposite sides of the bottom plate 100 in a first direction X, and both have support parts 1010 protruding toward an inner side of the backplane 10. The optical film 11 may be arranged on a side of the support part 1010 away from the bottom plate 100, and has two opposite ends supported on the support parts 1010. The light emitting part 12 may be arranged on the bottom plate 100 and positioned at a side of the support part 1010 facing the bottom plate 100. A light emitting direction of the light emitting part 12 may be toward the optical film 11.

In an embodiment of the present disclosure, as shown in FIGS. 1 and 2, the first direction X is parallel to the plane where the bottom plate 100 is located, and is parallel to one side of the bottom plate 100. Specifically, the orthographic projection of the bottom plate 100 on the plane where it is located may be a rectangle. In such case, the first direction X may be parallel to the long side of the rectangle.

In an embodiment of the present disclosure, the first side plate 101a and the second side plate 101b are respectively arranged along edges of the bottom plate 100, that is, are respectively arranged along two opposite edges of the bottom plate 100 in the first direction X. In addition, two outer side surfaces of the first side plate 101a and the second side plate 101b that are not opposite to each other in the first direction X are in a same plane with two side surfaces of the bottom plate 100 that are opposite in the first direction X, respectively.

It should be understood that in order to enable the light emitted by the light emitting part 12 to propagate to the optical film 11 without being blocked, the support part 1010 should be disposed relatively short, and the position of the support part 1010 should keep away from a light emitting area of the light emitting part 12 to alleviate the influence of the support part 1010 on light propagation. In other words, the protruding length of the support part 1010 shall be able to support the optical film 11, however not be too long. In addition, the backplane 10 may have an integrated structure to ensure an overall structural strength thereof.

In the embodiment, since the backplane 10 has the support part 1010 for supporting the optical film 11, and the light emitting direction of the light emitting part 12 is toward the optical film 11, the backlight module of the present disclosure may omit a middle frame, top cover and light guide plate compared with a traditional backlight module, which simplifies the structure of the backlight module, reduces the weight and cost of the backlight module, and reduces the thickness of the backlight module. Since the thickness of the backlight module is reduced, it is easier for the display panel with the backlight module to realize a curved surface effect by cold bending.

In addition, in the embodiment, the optical film 11 and the light emitting part 12 are respectively arranged on two sides of the support part 1010. There is a gap formed between the optical film 11 and the light emitting part 12 due to the support part 1010, which can alleviate the press of the optical film 11 on the light emitting part 12 when the optical film 11 is bent, and thus can alleviate a damage to the light emitting part 12 and improve the product yield.

For example, the backplane 10 may be made of aluminum plate material, which can ensure a structural strength of the backplane 10, and at the same time, can reduce a weight of the backplane 10. However, it should be understood that the backplane 10 is not limited to being made of the aluminum plate material, and may also be made of other materials.

Optionally, a thickness of each part of the backplane 10 is about 0.5 mm, so as to ensure the structural strength of the backplane 10 while facilitating the bending of the backplane 10 (especially the bottom plate 100 of the backplane 10). However, it should be understood that the thickness of each part of the backplane 10 is not limited to thereto, and may also have other values according to specific conditions.

In an embodiment, as shown in FIGS. 1 and 2, each of the first side plate 101a and the second side plate 101b of the backplane 10 may include a vertical plate and a bent plate which are integrally formed. The vertical plate has one end coupled to the bottom plate 100 and extends in the direction away from the bottom plate 100; and the bent plate has one end coupled to the bottom plate 100, and is bent toward the inner side of the backplane 10 to form the support part 1010. That is, in the embodiment, the support part 1010 is formed by bending a part of the first side plate 101a and the second side plate 101b, which ensures that the first side plate 101a and the second side plate 101b have the support parts 1010, and at the same time, can reduce the weights of the first side plate 101a and the second side plate 101b to make the backlight module lighter and thinner.

Specifically, as shown in FIGS. 1 and 2, the bent plate includes a first part and a second part. The first part has one end coupled to the bottom plate 100 and extends in the direction away from the bottom plate 100, and the second part has one end coupled to the other end of the first part in an extending direction of the first part and extends toward the inner side of the backplane 10 to form the support part 1010. A distance between the other end of the vertical plate in the extending direction of the vertical plate and the bottom plate 100 is greater than a distance between the surface of the support part 1010 away from the bottom plate 100 and the bottom plate 100, so that the vertical plate may limit the position of the optical film 11.

It should be understood that the first side plate 101a and the second side plate 101b can not only support the optical film 11, but also can limit the position of the optical film 11 through the vertical plate. That is, while the optical film 11 is supported on the support part 1010, the optical film 11 is also restricted between the vertical plates of the first side plate 101a and the second side plate 101b. The vertical plate of the first side plate 101a and the vertical plate of the second side plate 101b may restrict the optical film 11 from moving in the first direction X with a relatively large amplitude.

In addition, the optical film 11 may expand when being heated, and thus, in order to fit with the expansion of the optical film 11, there shall be gaps between the optical film 11 and the vertical plates of the first side plate 101a and the second side plate 101b.

Optionally, a plurality of vertical plates and a plurality of bent plates may disposed in the first side plate 101a and the second side plate 101b, and the vertical plates and the bent plates may be alternately arranged, so as to ensure a support stability of the optical film 11, and at the same time, ensure a force uniformity of the first side plate 101a and the second side plate 101b, thereby ensuring a structural strength of the first side plate 101a and the second side plate 101b.

For example, there are gaps between the support parts 1010 of the first side plate 101a and the second side plate 101b and the light emitting parts 12 in a thickness direction Z of the bottom plate 100 (the thickness direction Z is perpendicular to both the first direction X and the second direction Y), which can alleviate the press of the support part 1010 on the light emitting part 12 when the backlight module is bent, and thus can alleviate a damage to the light emitting part 12 and improve the product yield.

In order to ensure a support stability of the optical film 11, as shown in FIG. 2, the backplane 10 may further include a first auxiliary support plate 13a and a second auxiliary support plate 13b, and the first auxiliary support plate 13a and the second auxiliary support plate 13b are arranged at two opposite sides of the bottom plate 100 in a second direction Y. It should be noted that the second direction Y is perpendicular to the first direction X. As shown in FIGS. 1 and 2, each of the first auxiliary support plate 13a and the second auxiliary support plate 13b may include a connection part 130 and an auxiliary support part 131, the connection part 130 has one end coupled to the bottom plate 100 and extends in the direction away from the bottom plate 100, and auxiliary support part 131 has one end coupled to the other end of the connection part 130 in an extending direction of the connection part 130 and extends toward the inner side of the back board 10 and is used to support the optical film 11.

It should be understood that in order to ensure that the auxiliary support part 131 and the support parts 1010 of the first side plate 101a and the second side plate 101b jointly support the optical film 11, the surface of the auxiliary support part 131 away from the bottom plate 100 and the surface of the support part 1010 away from the bottom plate 100 may be located on a same plane. Further, the auxiliary support part 131 and the support part 1010 may have a same thickness to ensure that the distance between the auxiliary support part 131 and the light emitting part 12 and the distance between the support part 1010 and the light emitting part 12 are the same.

For example, the distance between the optical film 11 and the light emitting part 12 may be 2.5 mm, which can ensure that the display panel with the backlight module has no light shadow during normal display, thereby improving the display effect.

Optionally, the light emitting part 12 may include a circuit board and a plurality of light emitting diodes. The circuit board is arranged on the bottom plate 100. For example, the circuit board may be a flexible printed circuit board (FPC board), so that the circuit board may be adapted to a bent state. The circuit board may be adhered to the bottom plate 100 through a thermal conductive adhesive 17 (for example, 3M8805, Teraoka 7092 and the like). Each of the light emitting diodes may be arranged on the side of the circuit board away from the bottom plate 100. The light emitting diode may be a mini LED (mini light emitting diode) with a size of about 100 microns to reduce the thickness of the backlight module, so that the display panel with the backlight module may easily achieve a curved surface effect by cold bending.

Optionally, as shown in FIG. 1, the optical film 11 may include a quantum dot sheet 110, a diffusion sheet 111, a prism sheet 112, and a reflective polarizing sheet 113 that are sequentially stacked on the support part 1010. In the embodiment, the quantum dot sheet 110 may achieve a perfect high-color gamut image quality effect by using a high-frequency light source, such as a most commonly used blue light to excite the quantum dot sheet 110 to generate various color spectra. For example, the quantum dot sheet 110 may include red, green, and blue quantum dot regions, and the backlight module may use a light emitting diode capable of emitting blue light to excite the red, green, and blue quantum dot regions to respectively emit red light, green light, blue light, and the red light, blue light and green light are mixed to achieve a white light effect. The diffusion sheet 111 is disposed on the side of the quantum dot sheet 110 away from the support part 1010, and may provide a uniform surface light source for the display panel. The prism sheet 112 is disposed on the side of the diffusion sheet 111 away from the support part 1010 to improve a front brightness of the display panel. The reflective polarizing sheet 113 is disposed on the side of the prism sheet 112 away from the support part 1010, which can improve a utilization rate of light.

Since the optical film 11 is relatively thin and the protruding length of the support part 1010 is short, when the two opposite ends of the optical film 11 are supported on the support part 1010, the optical film 11 is likely to fall off from the support part 1010, Therefore, in order to enable the optical film 11 to be stably supported on the support part 1010, as shown in FIG. 1, the backlight module may further include a transparent support plate 14 which is disposed on the support part 1010 and is positioned at a side of the optical film 11 facing the support part 1010. That is, the transparent support plate 14 may be provided between the optical film 11 and the support part 1010. In the embodiment, by disposing the transparent support plate 14, the light emitted by the light emitting part 12 may be transmitted to the optical film 11 without being blocked, and a support area of the optical film 11 may be increased, thereby improving the support stability of the optical film 11.

The transparent support plate 14 may be made of a material such as polymethyl methacrylate (organic glass), but is not limited thereto. A thickness of the transparent support plate 14 may be 1.5 mm, so that it can ensure a structural strength of the transparent support plate 14, and at the same time, ensure that a distance between the optical film 11 and the light emitting part 12 reaches a target value to ensure the display panel with the module backlight has no light shadow during normal display, which improves the display effect.

An embodiment of the present disclosure also provides a display panel, which may be a liquid crystal display panel. The display panel may include a display module 1 which can be flexible. The display module 1 may include a backlight module, a display screen 15, and an edging adhesive tape 16.

Specifically, the backlight module may be the backlight module described in any of the foregoing embodiments, and details are not described herein again. The display screen 15 may be a liquid crystal display screen 15. The display screen 15 may be arranged on the side of the optical film 11 away from the support part 1010. The light emitted by the light emitting part 12 in the backlight module may reach the display screen 15 through the optical film 11. In addition, the display screen 15 may be located between the first side plate 101a and the second side plate 101b, and the first side plate 101a and the second side plate 101b may limit the position of the display screen 15. In addition, a top surface of the display screen 15 may be in a same plane with the top surfaces of the first side plate 101a and the second side plate 101b to facilitate subsequent edge wrapping.

The edging adhesive tape 16 may include a top edging adhesive tape 160 and a bottom edging adhesive tape 161 that are arranged oppositely, and a side edging adhesive tape 162 connecting the top edging adhesive tape 160 and the bottom edging adhesive tape 161, the top edging adhesive tape 160 is adhered to a top edge of the display screen 15 (i.e., an edge portion of a top surface of the display screen 15), the bottom edging adhesive tape 161 is adhered to a bottom edge of the bottom plate 100 (i.e., an edge portion of a bottom surface of the bottom plate 100), and the side edging adhesive tape 162 is adhered to side surfaces of the display screen and the backlight module. In the embodiment, the edging adhesive tape 16 may encapsulate the edges of the display screen 15 and the backlight module, and fix the display screen 15 and the backlight module.

Optionally, the display panel may further include a curved module housing 2. The module housing 2 may be made of an acrylic material (also known as organic glass), but is not limited thereto. The forgoing display module 1 may be installed in the module housing 2, and a shape of the display module 1 is matched with a shape of the module housing 2. That is, the entire display panel may have a cured shape.

In detail, since the display module 1 is bendable, after the aforementioned display module 1 is formed, the display module 1 may be bent into a shape that matches the shape of the module housing 2 by cold bending. Then, the bent display module 1 is installed in the module housing 2. The display module 1 and the module housing 2 may be fixed by a double-sided adhesive tape (for example, a 3M VHB type adhesive tape).

Those skilled in the art will easily conceive of other embodiments of the present disclosure after considering the specification and practicing the present disclosure. The present disclosure is intended to cover any variations, uses, or adaptive changes of the present disclosure, which follow the general principle of the present disclosure and include the common knowledge or conventional technical means in the technical field not disclosed by the present disclosure. The specification and the embodiments are only regarded as exemplary, and the true scope and spirit of the present disclosure are pointed out by the appended claims.

What is claimed is:

1. A backlight module, comprising:
a backplane comprising a bottom plate, a first side plate, and a second side plate, wherein the first side plate and the second side plate extend from a surface of the bottom plate in a direction away from the bottom plate and are arranged at two opposite sides of the bottom plate in a first direction, and both have support parts protruding toward an inner side of the backplane;
an optical film arranged on a side of the support part away from the bottom plate, and having two opposite ends supported on the support parts; and
a light emitting part arranged on the bottom plate and positioned at a side of the support part facing the bottom plate, wherein a light emitting direction of the light emitting part is toward the optical film, wherein:
the backplane further comprises a plurality of first auxiliary support plates and a plurality of second auxiliary support plates, and the first auxiliary support plate and the second auxiliary support plate are arranged at two opposite sides of the bottom plate in a second direction which is perpendicular to the first direction;
each of the first auxiliary support plates and the second auxiliary support plates comprises a connection part and an auxiliary support part, the connection part has one end coupled to the bottom plate and extends in the direction away from the bottom plate, and auxiliary support part has one end coupled to the other end of the connection part in an extending direction of the connection part and extends toward the inner side of the backplane; and
the connection parts of the plurality of first auxiliary support plates are spaced apart from each other in the first direction through a gap, and the connection parts of the plurality of second auxiliary support plates are spaced apart from each other in the first direction through a gap.

2. The backlight module according to claim 1, wherein:
each of the first side plate and the second side plate comprises a vertical plate and a bent plate which are integrally formed;
the vertical plate has one end coupled to the bottom plate and extends in the direction away from the bottom plate; and
the bent plate has one end coupled to the bottom plate, and is bent toward the inner side of the backplane to form the support part.

3. The backlight module according to claim 2, wherein:
the bent plate comprises a first part and a second part;
the first part has one end coupled to the bottom plate and extends in the direction away from the bottom plate; and
the second part has one end coupled to the other end of the first part in an extending direction of the first part and extends toward the inner side of the backplane to form the support part.

4. The backlight module according to claim 2, wherein a distance between the other end of the vertical plate in the extending direction of the vertical plate and the bottom plate is greater than a distance between the surface of the support part away from the bottom plate and the bottom plate.

5. The backlight module according to claim 2, wherein each of the first side plate and the second side plate comprises a plurality of vertical plates and a plurality of bent plates, and the plurality of vertical plates and the plurality of bent plates are arranged alternately.

6. The backlight module according to claim 1, wherein:
a surface of the auxiliary support part away from the bottom plate and the surface of the support part away from the bottom plate are located on a same plane.

7. The backlight module according to claim 6, wherein the auxiliary support part and the support part have a same thickness in a direction perpendicular to the surface of the bottom plate.

8. The backlight module according to claim 1, wherein a gap is positioned between the support part and the light emitting part in a direction perpendicular to the surface of the bottom plate.

9. The backlight module according to claim 1, wherein a distance between the optical film and the light emitting part is 2.5 mm.

10. The backlight module according to claim 1, further comprising a transparent support plate arranged on the support part and positioned at a side of the optical film facing the support part.

11. The backlight module according to claim 1, wherein the optical film comprises a quantum dot sheet, a diffusion sheet, a prism sheet, and a reflective polarizing sheet that are sequentially stacked on the support part.

12. The backlight module according to claim 1, wherein the light emitting part comprises a circuit board and a plurality of light emitting diodes, the circuit board is arranged on the bottom plate, and each of the light emitting diodes is arranged at a side of the circuit board away from the bottom plate.

13. The backlight module according to claim 2, wherein the optical film is arranged in the first direction, and is arranged between the vertical plate of the first side plate and the vertical plate of the second side plate.

14. A display panel comprising a display module, wherein the display module comprises:
a backlight module, comprising:
a backplane comprising a bottom plate, a first side plate, and a second side plate, wherein the first side plate and the second side plate extend from a surface of the bottom plate in a direction away from the bottom plate, and are arranged at two opposite sides of the bottom plate in a first direction, and both have support parts protruding toward an inner side of the backplane;
an optical film arranged on a side of the support part away from the bottom plate, and having two opposite ends supported on the support parts; and
a light emitting part arranged on the bottom plate and positioned at a side of the support part facing the bottom plate, wherein a light emitting direction of the light emitting part is toward the optical film; and
a display screen arranged at a side of the optical film away from the support part, wherein:
the backplane further comprises a plurality of first auxiliary support plates and a plurality of second auxiliary support plates, and the first auxiliary support plate and the second auxiliary support plate are arranged at two opposite sides of the bottom plate in a second direction which is perpendicular to the first direction;

each of the first auxiliary support plates and the second auxiliary support plates comprises a connection part and an auxiliary support part, the connection part has one end coupled to the bottom plate and extends in the direction away from the bottom plate, and auxiliary support part has one end coupled to the other end of the connection part in an extending direction of the connection part and extends toward the inner side of the backplane; and the connection parts of the plurality of first auxiliary support plates are spaced apart from each other in the first direction through a gap, and the connection parts of the plurality of second auxiliary support plates are spaced apart from each other in the first direction through a gap.

15. The display panel according to claim 14, wherein:

the display module further comprises an edging adhesive tape;

the edging adhesive tape comprises a top edging adhesive tape and a bottom edging adhesive tape that are arranged oppositely, and a side edging adhesive tape connecting the top edging adhesive tape and the bottom edging adhesive tape; and the top edging adhesive tape is adhered to a top edge of the display screen, the bottom edging adhesive tape is adhered to a bottom edge of the bottom plate, and the side edging adhesive tape is adhered to side surfaces of the display screen and the backlight module.

16. The display panel according to claim 14, further comprising a curved module housing, wherein the display module is installed in the module housing, and a shape of the display module is matched with a shape of the module housing.

17. The display panel according to claim 14, wherein a surface of the display screen away from the bottom plate and end surfaces of the first side plate and the second side plate away from the surface of the bottom plate are located on a same plane.

18. The display panel according to claim 14, wherein:

each of the first side plate and the second side plate comprises a vertical plate and a bent plate which are integrally formed;

the vertical plate has one end coupled to the bottom plate and extends in the direction away from the bottom plate; and the bent plate has one end coupled to the bottom plate, and is bent toward the inner side of the backplane to form the support part.

19. The display panel according to claim 18, wherein:

the bent plate comprises a first part and a second part;

the first part has one end coupled to the bottom plate and extends in the direction away from the bottom plate; and the second part has one end coupled to the other end of the first part in an extending direction of the first part and extends toward the inner side of the backplane to form the support part.

20. The display panel according to claim 18, wherein a distance between the other end of the vertical plate in the extending direction of the vertical plate and the bottom plate is greater than a distance between the surface of the support part away from the bottom plate and the bottom plate.

\* \* \* \* \*

UNITED STATES PATENT AND TRADEMARK OFFICE
CERTIFICATE OF CORRECTION

| | |
|---|---|
| PATENT NO. | : 11,262,496 B2 |
| APPLICATION NO. | : 17/254570 |
| DATED | : March 1, 2022 |
| INVENTOR(S) | : Wenyang Li et al. |

It is certified that error appears in the above-identified patent and that said Letters Patent is hereby corrected as shown below:

On the Title Page

Item (73), Column 1, in the "Assignees" section, please delete:
"BOE TECHNOLOGY GROUP CO., LTD., Beijing (CN); Beijing BOE Optoelectronics Technology Co., Ltd., Beijing (CN)"
And replace with:
"Beijing BOE Optoelectronics Technology Co., Ltd., Beijing (CN); BOE TECHNOLOGY GROUP CO., LTD., Beijing (CN)"

Signed and Sealed this
Twenty-first Day of March, 2023

Katherine Kelly Vidal
*Director of the United States Patent and Trademark Office*